J. G. DYER.
Coffee Pot.
No. 78,943.
Patented June 16, 1868.
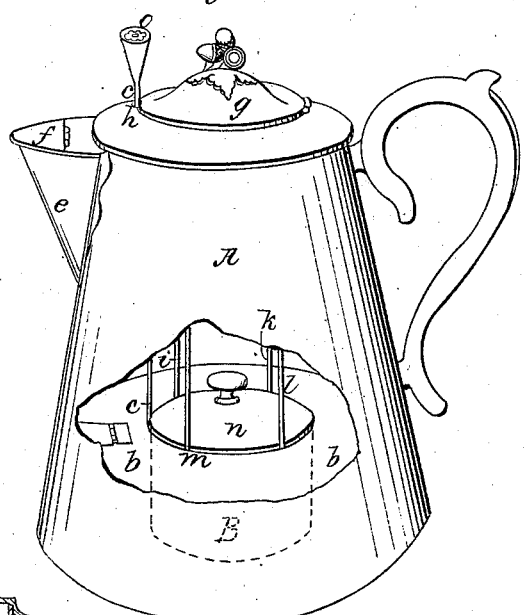
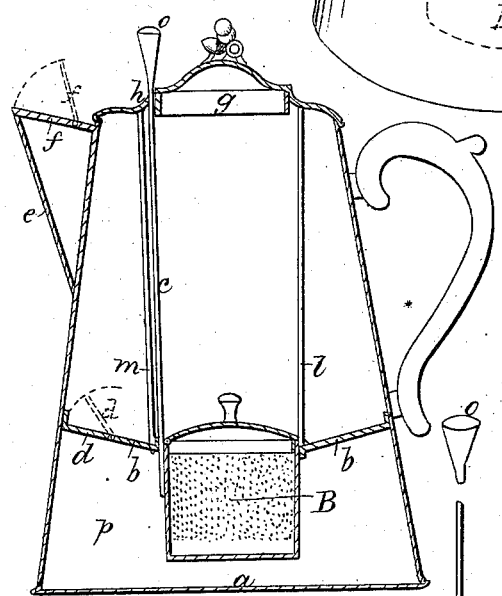
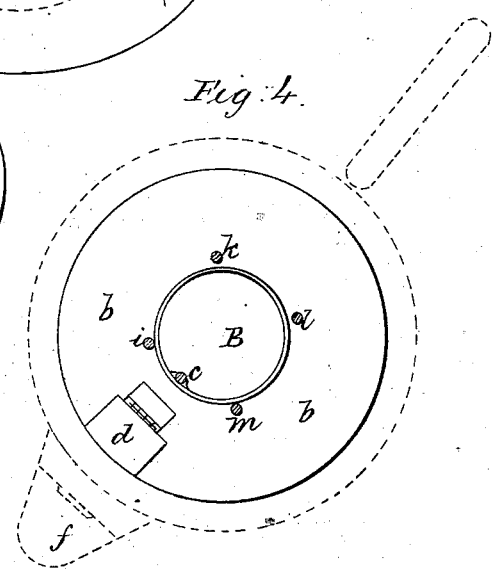
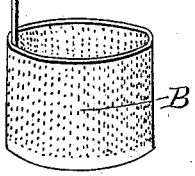
Witnesses
Inventor
Jonathan G. Dyer

United States Patent Office.

JONATHAN G. DYER, OF CHICAGO, ILLINOIS.

Letters Patent No. 78,943, dated June 16, 1868.

---

IMPROVEMENT IN COFFEE-POTS.

---

The Schedule referred to in these Letters Patent and making part of the same.

---

Be it known that I, JONATHAN G. DYER, of the city of Chicago, in the county of Cook, and State of Illinois, have invented a new and useful Apparatus for Making Coffee and Tea; and hereby declare that the following is a full, clear, and exact description of the construction and operation of the same, reference being had to the annexed drawings, making a part of this specification, in which—

Figure 1 is a perspective view,

Figure 2, section,

Figure 4, plan,

Figure 5, perspective view of strainer.

This coffee-pot is made of tin or other suitable metal, of any convenient size or shape, having soldered around its interior, about one-third of its height above bottom, a circular concave plate, $b$, of tin, (or other suitable metal,) having an aperture cut in the centre, large enough to admit a cup or strainer, B, which is to contain the coffee or tea. The concave plate entirely closes the space below it when the strainer B is placed therein. There is an opening through the concave plate, under the spout of pot, but closed with a hinged valve, $d$, designed to allow egress of the infusion. The "strainer" B is from two and a half inches to four inches deep, and about same diameter; in shape a cylinder; with perforated sides, and made of tin, the perforation ceasing at the distance of, say, one-fourth of an inch from the bottom of strainer. The perforations may be one-fortieth of an inch in diameter, or less or more, according to coarseness of coffee. The "strainer" has a movable cover, and there is also a wire, from seven to ten inches in length, serving as a handle, soldered to side of cup or strainer, (at $c$) and reaching above the cover of the coffee or tea-pot, through a hole cut for that purpose in the edge of cover, and terminating in a handle or button, $o$. The strainer, on its insertion into the opening in the plate $b$, rests, by its rim, in the same, and should reach to about one-fourth of an inch of the bottom of the pot. To four points on the sides of the opening just described, are fastened wires, $i\ k\ l\ m$, which, rising from thence, parallel to each other, are soldered to the edge of opening of pot, and serve as guides for insertion of the strainer in plate $b$. The pot is fitted with a hinged cover over the spout $f$.

The operation of this apparatus is as follows: The lower chamber of pot is half filled with water, and when boiling, the strainer containing coffee or tea, is placed in the aperture of plate $b$, entirely closing lower chamber $p$, and preventing, in a great degree, the steam and strength of the tea or coffee from escaping. Most of what escapes from the lower chamber is retained and condensed in the upper part of the pot, falling condensed back into hollow of plate, and into lower chamber. Before pouring the coffee out, the strainer should be taken out, and a sufficient quantity of hot water poured into the pot.

The advantages of this apparatus are that, first, it saves one-third of the usual amount of coffee or tea ordinarily used; second, the coffee or tea thus made is free from sediment; third, it is stronger, by one-third, than coffee of ordinary make; fourth, it precludes the necessity of clarifying the coffee by means of eggs and egg-shells, &c.

What I claim as my invention, and desire to secure by Letters Patent, is—

1. In a coffee or tea-pot, the combination of the imperforate division-plate $b$, the vessel or receptacle B, with the handle $c$, and the supporting and guiding-wires, all constructed and arranged substantially as shown and described.

2. The valve $d$, in combination with the division-plate $b$, as and for the purpose set forth.

JONATHAN G. DYER.

Witnesses:
WM. H. NUTTING,
EVERETT W. WALKER.